June 17, 1947.  L. A. SMITH  2,422,593

WHEEL SPOKE NUT DRIVING MACHINE

Filed Aug. 24, 1944  3 Sheets-Sheet 1

INVENTOR
LEON A. SMITH
BY *John H. Leonard*
ATTORNEY

INVENTOR
LEON A. SMITH
BY
ATTORNEY

June 17, 1947.  L. A. SMITH  2,422,593
WHEEL SPOKE NUT DRIVING MACHINE
Filed Aug. 24, 1944  3 Sheets-Sheet 3
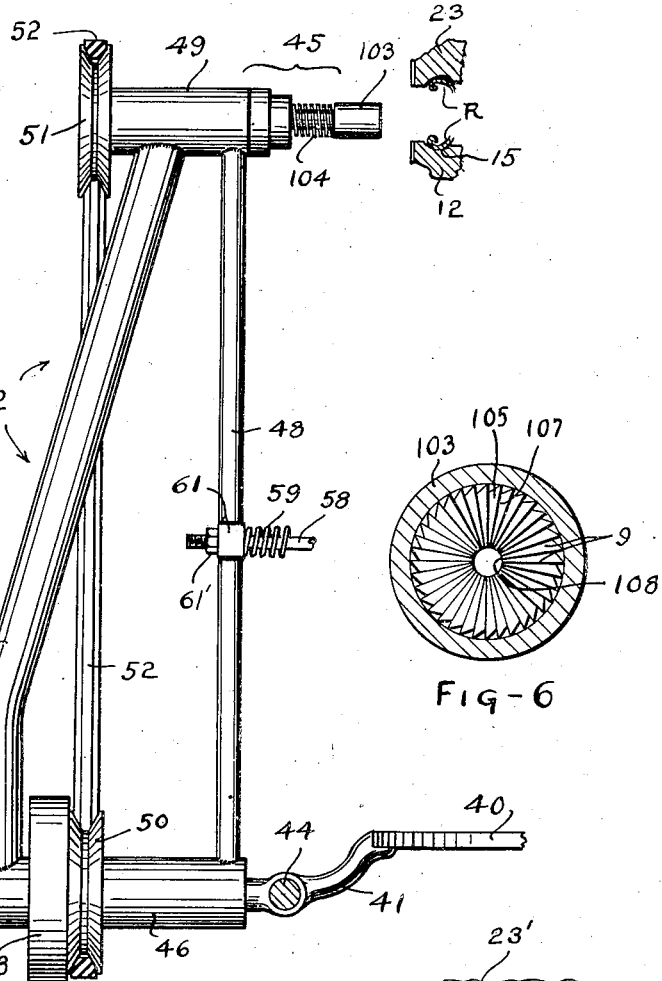
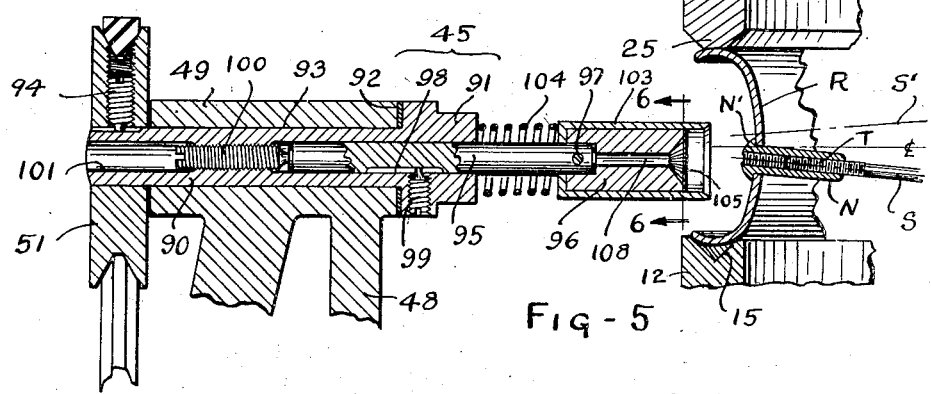
INVENTOR
LEON A. SMITH
BY
ATTORNEY Patented June 17, 1947

2,422,593

UNITED STATES PATENT OFFICE 2,422,593

WHEEL SPOKE NUT DRIVING MACHINE

Leon A. Smith, Shelby, Ohio, assignor to The Shelby Cycle Company, Shelby, Ohio, a corporation of Ohio Application August 24, 1944, Serial No. 550,944

3 Claims. (Cl. 157—1.5)

This invention relates to a method and machine for assembling wheels of the type having wire spokes connecting the hub and the rim or felloe, and particularly for tightening the spoke-tensioning nuts of such wheels. For convenience the wheels will usually hereinafter be referred to as cycle wheels but with intent only to identify the type and not any specific use.

The principal object is to provide an improved mechanism for simultaneously setting a plurality of spoke tensioning nuts of cycle wheels so that the hubs and rims thereof will be centered and the spokes equally tensioned.

A further object is to provide a cycle wheel spoke nut setting machine wherein a circularly arranged series of rotatable nut-setting chucks or wrenches are swung to nut engaging or driving positions and simultaneously rotated to turn and tighten the nuts.

Another object is to provide a spoke nut setting machine on which the loosely assembled wheel elements, namely hub, rim and spokes are adapted to be readily received and positively centered in position for the nut tightening operation to be performed thereon, in which the nuts for a set or half set of spokes (as on one side of the wheel) are tightened simultaneously and the wheel thereafter released quickly for enabling inverting of the wheel on the machine in order that the same operation can be effected on the remaining spokes of the wheel in such inverted position of the latter.

Another object is to provide a spoke nut setting machine provided with an indicator to inform the operator of the progress of the work and when the work is finished.

Other objects include the provision of an improved power-operated spoke nut driving chuck or wrench; an improved means for adjusting and locking a plurality of nut driving chucks on a machine in which the chucks are driven and advanced simultaneously; an improved means for centering the hub and gripping the rim preparatory to setting the spoke nuts to tension the spokes; and an improved air and hydraulic fluid system for operating the mechanism necessary to accomplish work such as outlined or indicated above.

Other objects and features of the invention will become apparent from the following description wherein a preferred embodiment is shown, for example, as adapted for setting spoke nuts on bicycle wheels. The essential characteristics are summarized in the claims.

In the drawings:

Fig. 4 is a relatively enlarged sub-assembly view of one of the nut setting mechanisms;

Fig. 5 is a further enlarged central sectional view of a nut driving chuck or wrench assembly and an associated portion of the wheel rim and grippers therefor in one form, and Fig. 6 is a transverse sectional end elevational view of the nut engaging portion of the chuck or wrench.

Figure 1:
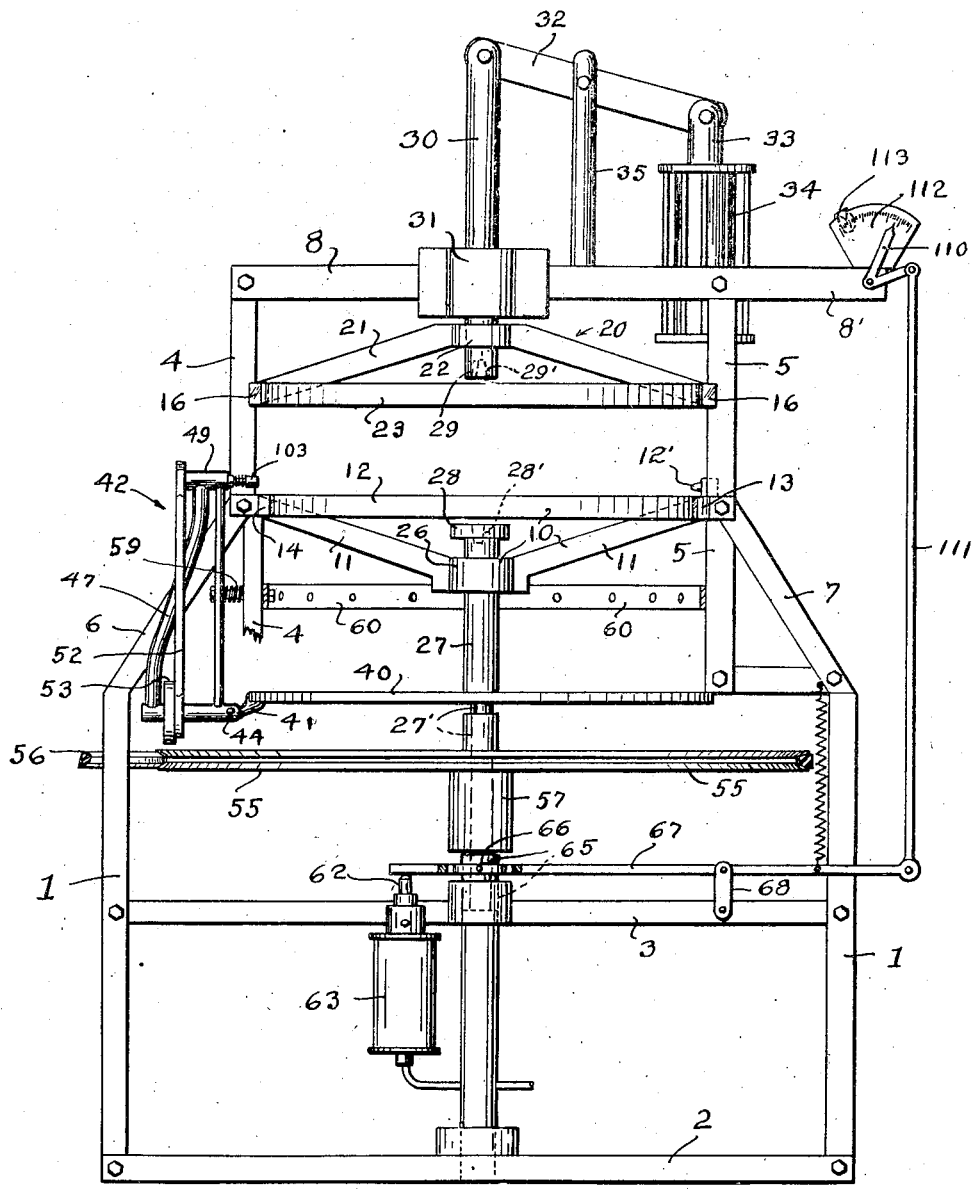
Fig. 1 is an assembly side elevation of the machine showing, however, only one nut tightening mechanism sub-assembly the others of the set being omitted for clearness of illustration of other parts.

Referring further to the drawings, the machine shown has an upright framework comprising interconnected bars, angles, channels or the like, Fig. 1 showing base uprights 1 cross connected as by members 2 and 3 and a super-structure of somewhat smaller size including upright members 4 and 5, diagonal brace and connecting members 6 and 7 and a cross connecting top beam 8. The latter extends outwardly beyond the super-structure at one side of the machine as at 8' to support a work progress indicator described later. There are additional supporting frame members for the base, not illustrated. The members 4 and 5 are additionally rigidly connected intermediately of their upper and lower ends by a non-rotatable but wheel-like framework 10 having a hub portion 26, spoke elements 11 and a rim comprising a relatively stiff metal ring 12, which ring is secured to the uprights 4 and 5 as by brackets 13 and 14 and to the spoke elements 11 as by welding. The framework 10 constitutes a support and centering rest for the wheel to be operated upon. The upper edge of the ring 12 is circularly grooved as shown at 15, Figs. 4 and 5, accurately to position and support the rim of such wheel.

Figure 2:
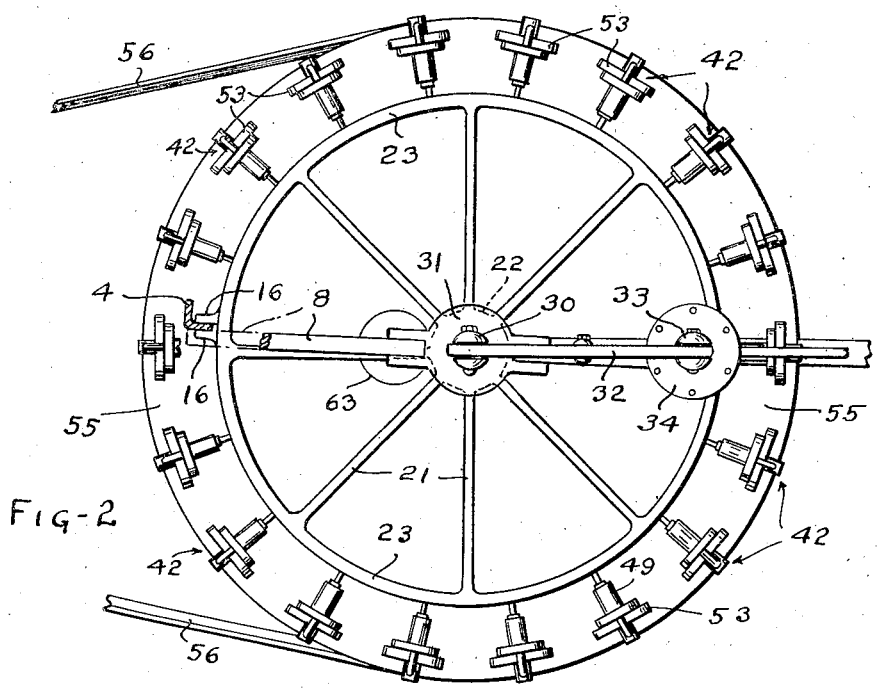
Fig. 2 is a plan view of the machine showing or indicating the positions of a complete set of nut tightening mechanism arranged in a circular series concentric with the wheel to be operated upon.

Slidably guided on the uprights 4 and 5 as by paired flange elements 16, Fig. 1 and at the left in Fig. 2, is another generally circular framework similar to 10 and indicated generally at 20. The frame 20 constitutes an upper vertically movable platen having spoke elements 21 attached to a central hub 22 and a ring 23 approximately the same size as the ring 12 and in vertical alignment therewith. The lower edge surface of the ring 23 may be formed similarly to the upper edge surface of the ring 12, as shown by Fig. 4, that is, circularly indented or grooved. The ring 23 forces the rim R of the wheel, see 23' Fig. 5, snugly into the aligning groove 15. The entire lower edge of the platen ring 23' may be made simply with a pressure rib of reduced area such as shown at 25, Fig. 5, that being sufficient to hold the upper part of the wheel rim in position since the rim is not subject to radial deflections if one side is held firmly.

Rigid with the fixed framework 10, being supported by the hub 26 thereof, is a post or column 27 which at its lower end is suitably supported by the cross member 2 of the main frame. Connected to the upper end of the post or, optionally, to the hub 26, is a suitable centering seat 28 for a portion of the hub of the wheel to be operated upon. The hub may be assumed to be the usual cycle hub with an axle assembled therein. The seat 28 corresponds to a similar hub-centering seat member 29 on the frame 20 which seat member 29 may be part of a slidably movable but non-rotatable rod or bar 30 carried in a bearing 31 mounted on the top bar 8 of the frame. The seats 28 and 29 are operatively identical and serve to hold the hub of the wheel to be operated upon in alignment or orientated position with respect to the rim of said wheel when the rim is forced into the locating groove 15 of the ring 12. The seat 28 may have for example a central socket diagrammatically indicated at 28' and the seat 29 a similar socket 29'. Such sockets are adapted to receive the projecting threaded ends of the wheel axle and, in order not to damage the threads, each socket may be lined with suitable non-abrasive material such for example as hard fiber. During operation of the machine after the spokes at one side of the median principal plane of the wheel have been tensioned by tightening of the usual spoke nuts, as will be described later, the wheel is inverted and the spokes at the opposite side of said plane are then tensioned.

The platen formed by the wheel-like framework 20 is raised and lowered by vertical movement of the rod or bar 30 which latter is connected as by a lever 32 with the operating plunger 33 of a fluid motor comprising for instance an air cylinder 34 and a piston inside the cylinder connected to the plunger. The lever 32 is connected intermediate of its ends to a fixed post 35 supported on the cross frame bar 8. The purpose of using the lever mechanism instead of mounting the fluid motor in line with the rod 30 is to minimize the height of the machine while enabling a considerable upward movement of the platen frame 20 in order readily to receive the work between the platen and the support 10.

The cylinder 34 may have any suitable rigid connection with the framework 8 and in order to compensate for swinging movement of the arms of the lever in the common plane of the rod 30 and plunger 33, the lever may have pin and slot connections, not shown, with said rod and plunger. Operating fluid such as air is supplied to the cylinder by any suitable means under the control of the operator as through a suitable valve, not shown. The motor constituted by the plunger and cylinder is preferably double acting, that is, driven by air in opposite directions as determined by the adjustment of the control valve. Alternatively a spring (not shown) may move the platen in one direction.

At the top of the lower frame structure and connected to the uprights 4 and 5—one connection between shown at 6—is a fixed plate 40 of circular form and through which the post 27 passes. The post is of reduced diameter as at 27' below the plate 40. Secured in uniformly spaced positions about the peripheral margin of the plate 40 are pivot brackets 41, one for each of a set of swingable frames such as shown most clearly in Fig. 4 at 42. The swingable frames 42 are individually pivoted as on pins 44 carried by the respective brackets 41 so that wheel spoke driving chuck assemblies, generally indicated at 45, can be moved toward and away from the ends of the spokes of the cycle wheel as will be apparent from comparison of Figs. 4 and 5. In the latter figure, one spoke of one half set of spokes is indicated at S and the associated tensioning nut at N. The nut has the usual rounded head at N' slotted to receive a screw driver type tool for spoke tension adjustment. The position of the complementary half set of spokes with reference to the median plane or center of the wheel is indicated by a broken line at S', Fig. 5.

Each of the swingable frames 42 may comprise a tubular base frame member 46, generally upright posts 47 and 48, preferably tubular, connected therewith and an upper tubular member 49 parallel with the base 46. The tubes may be welded together to form a lightweight but strong assembly particularly in the plane of the uprights 47 and 48. The tubular members 46 and 49 constitute journals for axles of pulleys 50 and 51 interconnected with flexible belts 52 so that rotation of the wheel 50 imparts rotation to the chuck or wrench assembly 45 rotatably carried by the journal tube 49.

For driving the pulleys 50 each has drivingly rigid therewith a friction wheel 53 having a suitable peripheral friction surface such as brake material, e. g. fiber or synthetic, and the friction wheels are all adapted to be brought simultaneously into elevating and driving contact with a top friction surface of a main driving disk or wheel 55 shown in Fig. 1 in the form of a pulley by which the main drive wheel may be turned through a flexible belt 56 and motor mechanism, not shown, but located at one side of the machine. The main drive wheel 55 has a hub portion 57 slidable and rotatable on the reduced diameter portion 27' of the upright post 27.

The cycle wheel, with the spokes loosely assembled both in the hub and rim and with the nuts N started as by hand on the threads T of the spokes, Fig. 5, is first placed on the supporting ring 12 and the platen 20 then lowered to clamp the rim in position and center the hub as by engagement of the sockets 28' and 29' with the wheel hub axle. Thereupon the main friction drive wheel 55 is raised by suitable mechanism into driving contact with the friction wheels 53 whereby the chuck or wrench assemblies 45 (later described in detail) are rotated and simultaneously moved inwardly toward the axis of the cycle wheel hub by being swung about the pivot pins 44 of the frames 42. It should be noted at this point that when the rim of the wheel is placed upon the ring 12, suitable means such as a locating pin 12', right Fig. 1, at one side of the ring enters the usual air valve opening of said rim. The air valve opening is always located accurately with respect to the two adjacent openings in the rim which receives the spoke nuts whereby, when the wheel rim is engaged with the projection 12' and seated on the locating groove 15 of the ring 12, all the spoke nut receiving openings of the rim will be operatively aligned with the chucks or wrenches of the swinging frame assemblies 42.

For maintaining the necessary friction pressure between the main drive wheel and the cooperating wheels 53 and for limiting the outward movement of the frames 42 rod and spring assemblies 58, 59 are provided, supported in part on a circular ring 60, Fig. 1, attached as to the uprights 4 and 5 of the framework. The rods 58, as shown in Fig. 4, slidably engage apertured brackets 61 on the frame tubes 48 and the coil springs 59, carried on the rods 58, react against the supporting ring 60 and tend to swing the pivoted frames 42 outwardly until abutment members 61' on the rods limit the outward swinging movement and prevent the friction drive wheels 53 from making further contact with the main drive wheel as the latter is further lowered as to the position in which shown on Fig. 1.

For raising and lowering the main drive wheel 55 on the reduced portion 27' of the post 27, a hydraulically operated upright plunger 62 in a cooperating cylinder 63 is supported on the main frame beneath said drive wheel to lift the hub 57 through a sleeve 65 slidable but not rotatable on the post 27. The sleeve 65 has a pivoted connection comprising diametrally opposite pins 66 entering a yoke portion of a lever 67 supported on a swingable pivot bracket 68 on the frame member 3. The outer end of the lever to the left of the post 27 bears downwardly on the working end of the plunger 62 so that when the plunger is raised in its cylinder the upper end of the sleeve 64 abuts the lower side of the hub 57 of the main drive wheel and raises said wheel into contact with the chuck-rotating drive wheels 53.

Figure 3:
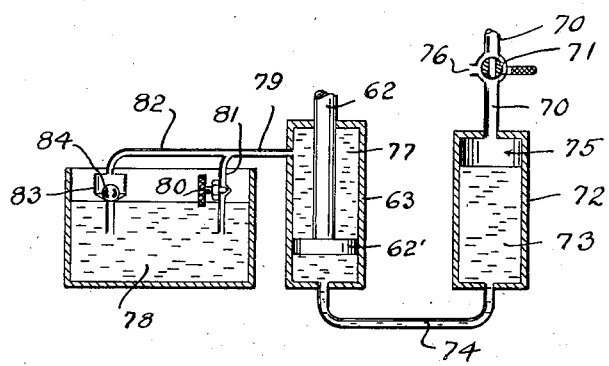
Fig. 3 is a schematic view of the air-hydraulic control system.

To operate the plunger 62 the arrangement schematically shown in Fig. 3 is preferred. In Fig. 3 an air supply line is shown at 70 controlled for example by a hand operated valve 71 to admit air to the top of a cylinder 72 containing a supply of hydraulic fluid such as oil as at 73. The oil in the cylinder 72 is conveyed to the lower end of the hydraulic cylinder 63 as through a conduit 74 so that when the oil is forced out of the cylinder 72 by air pressure in the air chamber 75 of said cylinder, the plunger 62 is driven upwardly through its piston 62'. The valve 71 may conveniently be made as a plug adapted to communicate the upper and lower parts of the air line 70 when in one position, for instance as shown in Fig. 3, and when in another position, as at right angles to the first, to discharge the air from the chamber 75 to atmosphere as through a passage 76. After the nut-setting operation is completed and the air is so discharged from the chamber 75 the weight of the wheel 55 and associated parts quickly drives the oil back through the duct 74 into the air cylinder.

In order that the upward movement of the drive wheel can be at regulatable slow speed, oil such as indicated at 77 in the upper part of the hydraulic cylinder 63 is controlled in its passage to a supply sump 78 as through a supply and discharge line 79 by an adjustable needle valve 80 in an oil discharge branch 81 of said line 79. The line 79 has a supply branch 82 leading to the sump through a valve chamber 83 in which chamber there is a check valve 84 enabling free movement of oil from the sump into the branch 82 and thus to the line 79 and cylinder space 77 but blocking opposite movement of oil through the branch 82. The arrangement just described constrains the passage of oil from above the piston 62' into the sump to be at a controllable slow speed by virtue of the needle valve but enables the free flow of sump fluid into the upper part of the cylinder 63 wherefore the main drive wheel 55 can be moved quickly as by gravity or a suitable return spring (not shown) in the lowering direction to swing the chuck or wrench frames outwardly and finally cause disengagement between the main drive wheel 55 and the friction wheels 53.

Referring now to the driving chuck assembly 45 and particularly to the showing thereof made by Fig. 5, the tubular member 49 of each frame 42 carries a rotary spindle 90 having an enlarged head at 91 in working abutment with a thrust bearing washer 92 at the right hand end of the tubular journal constituted by the member 49. A reduced cylindrical portion 93 of the spindle projects to the left of the tubular journal and the drive pulley 51 is secured in sliding abutment with said end of the journal as by a set screw 94 so that the spindle can turn freely. Adjustably mounted in a central bore 101 of the spindle is a generally cylindrical supporting shaft 95 for a chuck or wrench head 96 shown as pinned to the free end of the shaft 95 which projects to the right as at 97 from the supporting bore. The shaft 95 is longitudinally slotted as at 98 for some distance along it for engagement by a set screw 99 carried on the head 91 of the spindle so that the shaft 95 is prevented from rotating in the spindle and is securely held against axial movement, i. e. in directions toward and away from the cycle wheel. For adjusting the various shafts 95 individually in order to move the chucks or wrenches 96 into exactly the right position so that all the wrenches will simultaneously seat the head portions N' of the spoke nuts against the rim of the wheel, there is provided an adjusting screw 100 in a threaded portion of the central bore 101 of the spindle. The bores 101 are open at the outer ends of the respective spindles for receiving an adjusting tool such as a screw driver by which the screws 100 are moved toward or away from the work prior to tightly seating the locking screws 99.

The chuck or wrench supporting assembly 45 is shown in Fig. 5 in an initial position prior to driving the spoke nut N into the seated position shown. As the frames 42 are swung inwardly by the raising of the main drive wheel 55 the longitudinal axes of the driving spindles come more nearly into alignment with a half set of spokes such as exemplified by the spoke S in Fig. 5. During such movement if the nuts are slightly out of alignment with the associated chucks or wrenches 96 such nuts are brought into alignment therewith by retractable sleeves 103 slidably mounted on the respective chuck heads 96 and shafts 95 and adapted to be positioned therealong outwardly away from the wheel axis toward the driving spindle as by engagement with the rim R of the wheel in mounted position.

A coil spring 104 between each sleeve 103 and associated head 91 of the spindle normally biases the guide sleeve into the initial projected position in which shown in Fig. 5.

For engagement with the heads N' of the nuts N instead of providing screw driver members such as usually used to seat the nuts, a conical arrangement of ratchet teeth such as shown at 105, Figs. 5 and 6, is used. The generally conical arrangement of teeth diverging radially away from the engaged spoke nuts tends to center the nuts and bring all of the ratchet teeth into slightly indenting driving engagement therewith. The teeth are sloped in a direction such as to cause the sharp edges 107 of the teeth slightly to indent the generally rounded end surfaces of the nut heads for practically positive turning movement of the nuts. It sometimes happens that the spokes are sufficiently long so that they will project through the nuts in the seated position of the latter and in that event, said spoke ends will be received into respective small bores 107 in the chuck or wrench heads 95 provided to receive such projecting ends of the spokes.

An additional feature of the machine mentioned above is the progressively acting indicator, shown at 110, Fig. 1, which by reason of linkage connections at 111 with the operating lever 67 for the main drive wheel 55 is caused to swing over a dial 112 carried for example on the portion 8' of the top bar 8 of the machine frame. When the indicator points to the "finish" indication on the dial or to a cooperating adjustable pointer such as 113 positioned thereon, the operator knows that the work is finished and releases the air pressure in the cylinder 72, causing all the chuck carrying frames 42 to swing outwardly to inactive positions.

I claim:

1. In a machine for tightening spoke nuts on cycle type wheels, a circular arrangement of rotary chuck-carrying frames, means individually guiding and supporting the frames so that the chucks carried thereby can move substantially along the axes of the respective spokes to turn nuts thereon, a single power operated means for moving the guiding and supporting means to cause the chucks to make driving, follow-up contact with the nuts, and means operated by said power operated means simultaneously to effect turning movement of the chucks.

2. In a machine for tightening spoke nuts on cycle type wheels, a mounting for the wheel, a circular arrangement of chuck carrying frames concentric with the wheel, pivotal supports for the frames, chuck driving spindles on each of the frames substantially aligned with respective nuts to be tightened, friction wheels on each of the frames, mechanisms connecting said wheels with the spindles for turning them, a main friction drive wheel and means for moving said wheel along its axis of rotation into driving contact with the friction wheels of said frames, said drive wheel through the intermediary of the friction wheels causing pivotal movement of the frames to advance the chucks in contact with respective nuts.

3. In a machine for tightening spoke nuts on cycle type wheels, supporting and centering means for the hub and rim of the wheel, a plurality of chuck-carrying spindles arranged about the rim and adapted for inward and outward movement in substantial alignment with spoke nuts to be tightened, respective pivoted supporting mechanisms for the spindles, means for simultaneously pivotally moving said supporting mechanisms thereby to move the spindles, said last named means operating simultaneously to turn the spindles.

LEON A. SMITH.

REFERENCES CITED

The following references are of record in the file of this patent:

UNITED STATES PATENTS

| Number | Name | Date |
|---|---|---|
| 2,110,537 | Tautz | Mar. 8, 1938 |
| 618,415 | Hontschka | Jan. 31, 1899 |
| 1,141,864 | Boucher | June 1, 1915 |
| 1,944,596 | Farr et al. | Jan. 23, 1934 |
| 557,002 | Metz | Mar. 24, 1896 |
| 1,876,356 | Sneed | Sept. 6, 1932 |
| 1,921,223 | Eksergian | Aug. 8, 1933 |
| 1,979,966 | Farr et al. | Nov. 6, 1934 |
| 1,980,129 | Eksergian et al. | Nov. 6, 1934 |
| 569,888 | Sanderson | Oct. 20, 1896 |
| 610,652 | Hurst et al. | Sept. 13, 1898 |
| 1,357,056 | House, Jr. | Oct. 26, 1920 |
| 1,578,760 | Replogle | Mar. 30, 1926 |
| 906,040 | Lucas | Dec. 8, 1908 |
| 974,239 | Dalton | Nov. 1, 1910 |

FOREIGN PATENTS

| Number | Country | Date |
|---|---|---|
| 312,529 | Great Britain | May 30, 1929 |